United States Patent
Marquez et al.

(10) Patent No.: US 11,975,661 B2
(45) Date of Patent: May 7, 2024

(54) METHOD OF MANUACTURING A THREE-DIMENSIONAL WORK VEHICLE WIRING HARNESS

(71) Applicant: Deere & Company, Moline, IL (US)

(72) Inventors: Jorge Marquez, Cedar Falls, IA (US); Bahubali Zade, Solapur (IN); Vedaraj Thakare, Karanja Lad (IN); Nakib Siddiqui, Pune (IN); Sonam Pirgal, Pune (IN); Prashant Pulliwar, Pune (IN)

(73) Assignee: DEERE & COMPANY, Moline, IL (US)

( * ) Notice: Subject to any disclaimer, the term of this patent is extended or adjusted under 35 U.S.C. 154(b) by 195 days.

(21) Appl. No.: 17/388,296

(22) Filed: Jul. 29, 2021

(65) Prior Publication Data
US 2023/0034326 A1 Feb. 2, 2023

(51) Int. Cl.
| | | |
|---|---|---|
| H01B 13/012 | (2006.01) | |
| B60R 16/02 | (2006.01) | |
| G06F 30/18 | (2020.01) | |
| H01R 43/28 | (2006.01) | |
| G06F 113/16 | (2020.01) | |

(52) U.S. Cl.
CPC ... *B60R 16/0215* (2013.01); *H01B 13/01227* (2013.01); *H01B 13/01245* (2013.01);
(Continued)

(58) Field of Classification Search
CPC ........ H01B 13/01245; H01B 13/01272; H01B 13/01227; G06F 30/18; G06F 2113/16;
(Continued)

(56) References Cited

U.S. PATENT DOCUMENTS 5,535,511 A * 7/1996 Karasik ............... B60R 16/0215
29/33 M
6,299,469 B1 10/2001 Glovatsky et al.
(Continued)

FOREIGN PATENT DOCUMENTS

GB 2283946 A 5/1995
JP 2007283664 A 11/2007
(Continued)

OTHER PUBLICATIONS

Heisler et al, "Development and Validation of a Material Application Tool for the Covering Process of a Wire Harness," 2020 10th International Electric Drives Production Conference (EDPC), Ludwigsburg, Germany, 2020, pp. 1-7. (Year: 2020).*
(Continued)

*Primary Examiner* — A. Dexter Tugbang
(74) *Attorney, Agent, or Firm* — KLINTWORTH & ROZENBLAT IP LLP

(57) ABSTRACT

A method of manufacturing a wiring harness for a work vehicle includes providing a tool board assembly having a tool board base, wire supports extending from the tool board base each having a wire holder on a top end thereof distal from the tool board base, and a plurality of I/O connector holders extending from the tool board base and each having an angularly adjustable connector mount. A wiring harness is provided having a main harness branch and a plurality of breakout harness branches extending off the main harness branch, with each breakout harness branch having an I/O connector at an end thereof. The wiring harness is configured, via arranging thereof on the tool board assembly, to arrange the breakout harness branches at a plurality of breakout angles relative to the main harness branch and at oblique-angle orientations that are non-parallel and non-perpendicular to the tool board base.

19 Claims, 8 Drawing Sheets

(52) U.S. Cl.
CPC ....... *H01B 13/01272* (2013.01); *H01R 43/28* (2013.01); *G06F 30/18* (2020.01); *G06F 2113/16* (2020.01); *Y10T 29/49174* (2015.01); *Y10T 29/49208* (2015.01); *Y10T 29/53265* (2015.01)

(58) Field of Classification Search
CPC ......... Y10T 29/49174; Y10T 29/49208; Y10T 29/53265; B60R 16/0215; H01R 43/28
See application file for complete search history.

(56) References Cited

U.S. PATENT DOCUMENTS

| | | |
|---|---|---|
| 8,835,768 B2 | 9/2014 | Sekine |
| 9,019,722 B2 | 4/2015 | Parry-Jones et al. |
| 2015/0100187 A1 | 4/2015 | Light et al. |
| 2016/0325699 A1 | 11/2016 | Yoshida et al. |
| 2020/0168369 A1* | 5/2020 | Chalil .............. H01B 13/01245 |

FOREIGN PATENT DOCUMENTS

| | | | |
|---|---|---|---|
| JP | 2007287366 A | | 11/2007 |
| JP | 2014186807 A | * | 10/2014 |

OTHER PUBLICATIONS

Utility U.S. Appl. No. 17/183,560, filed Feb. 24, 2021.

* cited by examiner

METHOD OF MANUACTURING A THREE-DIMENSIONAL WORK VEHICLE WIRING HARNESS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to embodiments of work vehicle systems including wiring harnesses that provide electrical interconnections to various electronic devices integrated into the work vehicle system.

BACKGROUND OF THE DISCLOSURE

Work vehicles are complex machines containing various electronic components, which are conventionally electrically interconnected utilizing numerous wires or cables bundled as wiring harnesses. Such wiring harnesses may be utilized to interconnect operator input devices (e.g., joystick devices), display devices, and other components within the operator station of a work vehicle of the type utilized in the automotive, agriculture, forestry, mining, or construction industry. Similarly, wiring harnesses are commonly utilized to interconnect the various electronic devices integrated into work vehicle engine systems or powertrains. In this latter regard, one or more wiring harnesses may be routed about the exterior of a work vehicle engine and affixed thereto at various locations. The wires within the wiring harness branch from the main harness body to connect to externally accessible input/output interfaces for sensors, actuators, and similar electronic devices integrated into the engine. Such electrical interconnections allow power routing to the integrated electronic devices, while further providing signal communication between the electronic devices and an external controller, such an Engine Control Unit (ECU), onboard the work vehicle.

SUMMARY OF THE DISCLOSURE

A method of manufacturing a wiring harness in a work vehicle system is disclosed. The method includes providing a tool board assembly having a tool board base, a plurality of wire supports extending from the tool board base and each having a wire holder on a top end thereof distal from the tool board base, and a plurality of input/output (I/O) connector holders extending from the tool board base and each having an angularly adjustable connector mount on a top end thereof distal from the tool board base. The method also includes providing a wiring harness comprising a main harness branch and a plurality of breakout harness branches extending off the main harness branch, with each breakout harness branch having an I/O connector at an end thereof, and configuring the wiring harness, via arranging thereof on the tool board assembly, to arrange the plurality of breakout harness branches at a plurality of breakout angles relative to the main harness branch and at oblique-angle orientations that are non-parallel and non-perpendicular to the tool board base.

Another method of manufacturing a wiring harness for a work vehicle is provided that uses a tool board assembly including a tool board base, a plurality of wire supports extending from the tool board base and each having a wire holder on a top end thereof distal from the tool board base, and a plurality of input/output (I/O) connector holders extending from the tool board base and each having an angularly adjustable connector mount on a top end thereof distal from the tool board base. The method includes positioning a main harness branch of the wiring harness on a portion of the plurality of wire supports, routing a plurality of breakout harness branches off from the main harness branch and through another portion of the plurality of wire supports, and coupling an I/O connector at an end of each of the plurality of breakout harness branches to a respective I/O connector holder of the plurality of I/O connector holders. In routing the plurality of breakout harness branches through the another portion of the plurality of wire supports and in coupling the I/O connectors to the plurality of I/O connector holders, the plurality of breakout harness are routed through wire holders at a plurality of heights relative to the tool board base and at a plurality of angles relative to the main harness branch, and the I/O connectors are coupled to angularly adjustable connector mounts at a plurality of heights relative to the tool board base and at a plurality of angles relative to the tool board base, such that the plurality of breakout harness branches are held at a plurality of breakout angles relative to the main harness branch and at oblique-angle orientations that are non-parallel and non-perpendicular to the tool board base.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
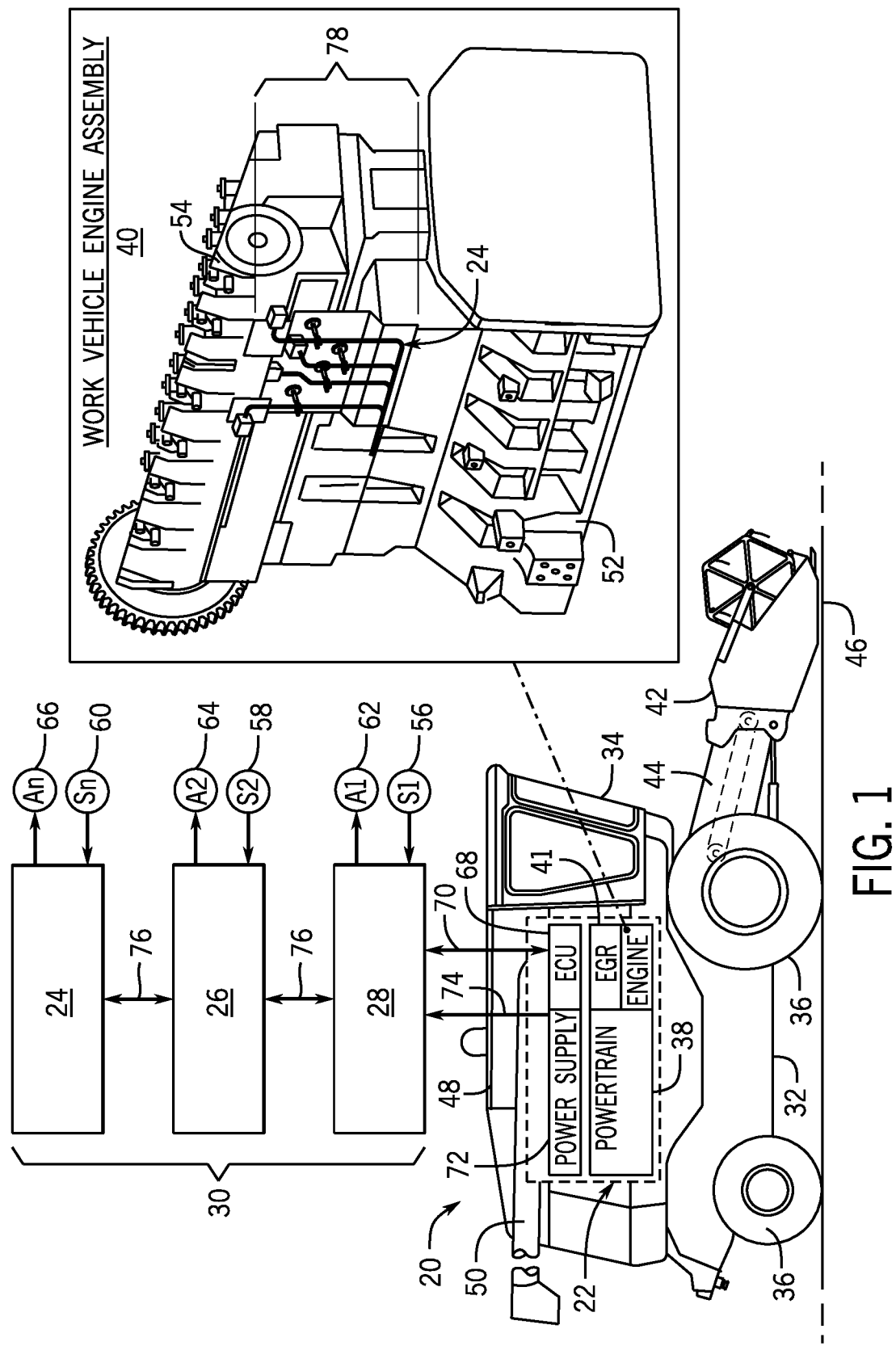
FIG. 1 schematically illustrates a work vehicle system onboard a work vehicle (here, a work vehicle engine system onboard a combine harvester) including multiple wiring harnesses, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As noted above, wiring harnesses are commonly utilized within work vehicles to provide signal and power routing to various electronic devices integrated into work vehicle systems. Wires within the wiring harness branch from the main harness body, with these "branches" connecting to externally accessible input/output interfaces for sensors, actuators, and similar electronic devices integrated into the engine. The exact configuration of the branches of the wiring harness is dependent on the work vehicle and the arrangement of the electronic devices thereon but, in general, it is recognized that the branches should breakout from the main harness body at a plurality of different locations to provide for connecting of the wiring harness with the input/output interfaces of the work vehicle electronic devices.

In manufacturing and assembling a wiring harness, it is important that the resulting configuration of the branches of the wiring harness match what will be required of the wiring harness when included on the work vehicle and connected to the electronic devices thereof. That is, if the branches on the wiring harness are at an incorrect position and/or at an improper orientation, a length of the branches may be shortened and stress may be placed on the wiring harness so that the wiring harness may be unable to properly connect to the electronic devices. As one example, if branches on the wiring harness are incorrectly positioned or oriented, the branches may interfere with other machine components when connected to the electronic devices and thereby cause damage to the branch wires resulting from friction between the wires and components or thermal transfer between the component and the wires. As another example, when branches on the wiring are incorrectly positioned or oriented, the branches may need to be bent into a desired routing to be connected to a corresponding electronic device, which may place stress on the branch wires and reduce the length of the branch by an amount that may lead to an improper connection to the electronic device due to terminal pull out, thereby leading to a potential malfunctioning of the electronic device(s).

Existing processes for manufacturing wiring harnesses may lead to a mismatch between a desired wiring harness configuration (i.e., the positioning and arrangement of branches on the main harness body) and a wiring harness configuration that is actually assembled. Traditionally, a wiring harness assembly is manufactured using a tool board assembly that includes a plurality of wire supports and input/output (I/O) connector holders that extend up from a planar tool board base. A manufacturer is provided with a 2D drawing of a desired wiring harness configuration that indicates breakout locations of branches off the main harness body and the tool board assembly is configured accordingly based off the 2D drawing, with the wire supports and I/O connector holders positioned on the board to provide for positioning and arrangement of the branches in accordance with the 2D drawing. However, the 2D drawing will not accurately capture the 3D aspects of a desired wiring harness configuration, i.e., orienting of branches at a plurality of angles, that provide for proper routing and attachment of wiring harness branches to electronic devices when installed on the work vehicle. Instead, arranging the wire supports and I/O connector holders on the tool board base according to the 2D drawing results in all the wire supports and I/O connector holders extending up from the tool board base at a same height, with the main harness body and branches then being positioned on the wire supports and I/O connector holders such that the branches are all set along a common horizontal plane. This arrangement of all harness branches along a common horizontal plane may result in stresses being placed on the wiring harness and improper device connections when installed on a work vehicle, as previously described.

To address the issue of improper wiring harness manufacturing, a method of manufacturing a wiring harness in a work vehicle system is provided. The method utilizes a 3D model of the wiring harness that is generated according to a planned connection of the wiring harness to a plurality of electrical components in the work vehicle. The 3D model of the wiring harness includes a plurality of breakout harness branches arranged at a plurality of modeled breakout angles relative to the main harness branch and at oblique-angle orientations that are non-parallel and non-perpendicular to a tool board base. The tool board assembly is configured according to the 3D model, with the wire supports and the I/O connector holders positioned at a plurality of different heights above the tool board base and with the I/O connector holders set at a plurality of different angles relative to the tool board base. The wiring harness is then positioned on the tool board assembly, with the main harness branch and the breakout harness branches supported and held by the wire supports and the I/O connector holders to arrange the breakout harness branches at breakout angles and orientations that match the modeled breakout angles and orientations from the 3D model.

According to an embodiment, the wire supports and the I/O connector holders include a base shaft that may be adjusted to a plurality of different heights above the tool board base. The wire supports and the I/O connector holders may be set to heights above a height of the main harness branch and below a height of the main harness branch, such that the breakout harness branches are oriented at angles below and above a horizontal plane within which the main harness branch is primarily located. Additionally, a connector mount positioned at a top end of each of the I/O connector holders may be angularly adjusted by pivoting the connector mount about a pivot point located at a top end of a base shaft. An I/O connector at the end of each of the breakout harness branches may be secured to a respective angularly adjustable connector mount, to hold the breakout harness branch in place.

In one implementation, the breakout harness branches are oriented circumferentially about the main harness branch about a 360° range of the main harness branch and at oblique-angle orientations that are non-parallel and non-perpendicular to the tool board base—such as at angles of 30°, 45° or 60°, as examples.

An embodiment of a work vehicle system containing one or more wiring harnesses will now be described in conjunction with FIGS. 1-2, with an example wiring harness and method of manufacturing such wiring harness discussed below in connection with FIG. 3 and FIGS. 4-6. In the following example, the wiring harness is principally described as utilized within a specific type of work vehicle system (a work vehicle engine system), which is deployed onboard a specific type of work vehicle (a combine harvester). In further embodiments, however, the below-described wiring harness and variants thereof can be integrated into other types of work vehicle systems, such as work vehicle systems having relatively high wire routing densities or otherwise traditionally reliant on relatively complex wiring harness interconnections; e.g., operator interface systems containing multiple operator input devices (e.g., joysticks or control levers), display devices, and similar electronic components commonly located onboard work vehicles. Further, embodiments of the wiring harnesses can be integrated into various different types of work vehicles employed within the agricultural, construction, forestry, and mining industries. Accordingly, the following description should be understood as merely establishing a non-limiting context in which embodiments of the present disclosure may be better understood.

Figure 2:
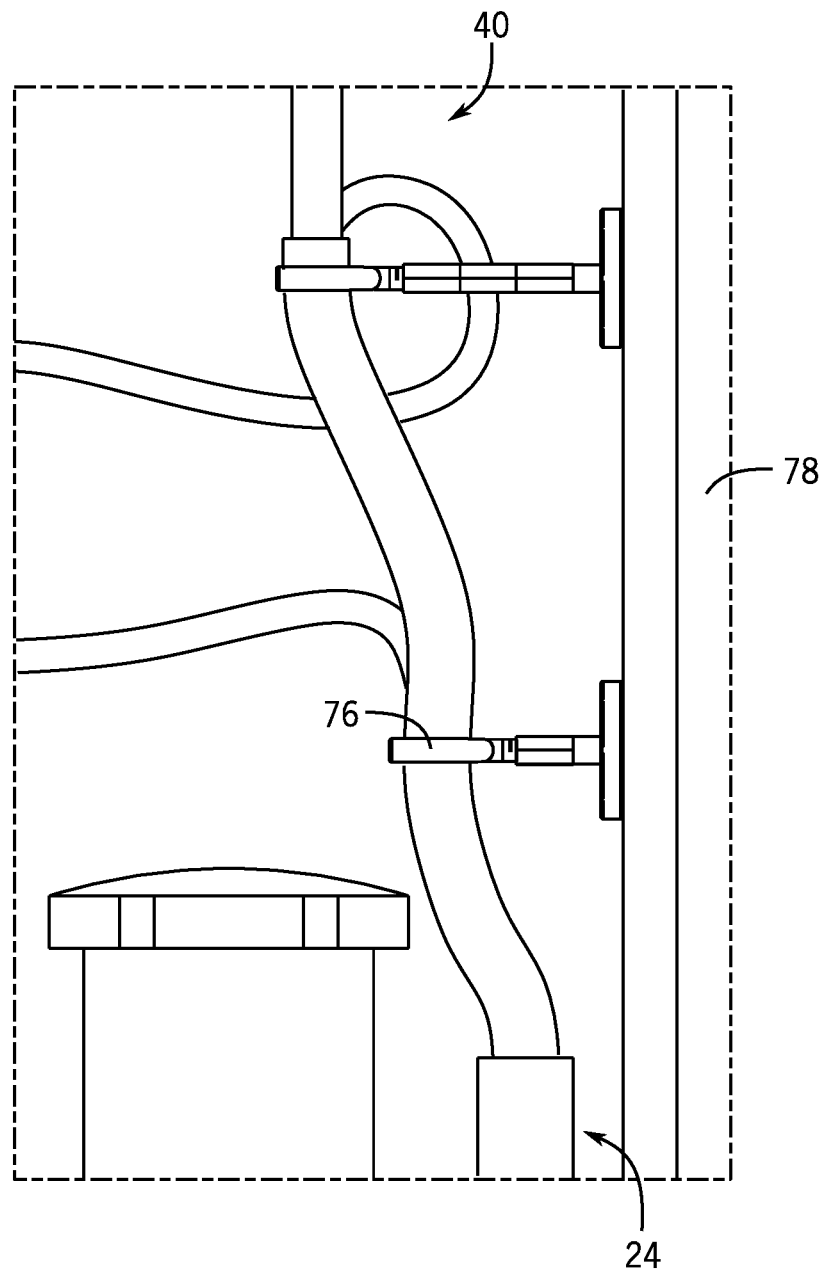
FIG. 2 is an isometric view of a portion of an example wiring harness secured to and connected with the work vehicle engine system shown in FIG. 1.

Example Embodiments of a Three-Dimensional Work Vehicle Wiring Harness and a Method of Manufacturing Thereof Turning now to the drawings and referring initially to FIG. 1, there is shown a work vehicle in the form of a combine harvester 20 containing a work vehicle engine system 22 including wiring harnesses 24, 26, 28, as illustrated in accordance with an example embodiment of the present disclosure. The wiring harnesses 24, 26, 28 may be isolated from one another or electrically interconnected to collectively form a wiring harness subsystem 30, as indicated in the upper left of FIG. 1. The wiring harnesses 24, 26, 28 and the wiring harness subsystem 30 are described more fully below in connection with FIGS. 2-5. First, however, additional description of the combine harvester 20 is provided to establish an example context in which embodiments of the present disclosure may be better understood.

In addition to the work vehicle engine system 22, the combine harvester 20 includes a body or chassis 32, a cabin 34 located at or adjacent a forward portion of the chassis 32, and an operator station enclosed by the cabin 34. The harvester chassis 32 is supported by ground-engaging wheels 36. The wheels 36 of the work harvester chassis 32 are driven through a powertrain 38 including a work vehicle engine assembly 40, an example of which is illustrated in greater detail in an upper right region of FIG. 1. A standard header or grain platform 42 is mounted to a feeder house 44, which projects from the leading end of the combine harvester 20 in a forward direction. As the combine harvester 20 travels over a field 46, crop plants are severed by the grain platform 42, taken into the feederhouse 44, and processed in subsequent sections of the harvester 20. Clean grain is delivered via a to a clean grain tank 48 via non-illustrated clean grain elevator contained within a central portion of the combine harvester 20. The clean grain collected within the clean grain tank 48 can be offloaded from the combine harvester 20, perhaps while the combine harvester continues to travel over the field 46 in a forward direction, utilizing an unloading auger 50.

In the example of FIG. 1, the work vehicle engine assembly 40 assumes the form of a diesel engine including an engine block 52 and a header assembly 54. The work vehicle engine assembly 40 may also include various other components or subsystems in further embodiments. For example, as generically shown in FIG. 1, the work vehicle engine assembly 40 may assume the form of a heavy-duty diesel engine including an Exhaust Gas Recirculation (EGR) subsystem 41 for emissions control. Generally, the form assumed by the work vehicle engine assembly 40 will vary depending upon the particular type of work vehicle within which the work vehicle engine assembly 40 is installed. Regardless of its particular form, the work vehicle engine assembly 40 contains various electronic components, including one or more sensors 56, 58, 60 and one or more actuators 62, 64, 66, integrated into the work vehicle engine assembly 40. The sensors 56, 58, 60 and the actuators 62, 64, 66 (collectively, the "integrated electronic devices 56, 58, 60, 62, 64, 66") are schematically shown in an upper portion of FIG. 1 for clarity; however, it will be appreciated that such devices are integrated into the work vehicle engine assembly 40 and thus generally cannot be seen from the exterior of the engine assembly 40. A non-exhaustive list of the sensors 56, 58, 60 suitably integrated into the work vehicle engine assembly 40 in embodiments includes oxygen sensors, mass air flow sensors, knock sensors, throttle position sensors, and temperature sensors. In embodiments in which the work vehicle engine assembly 40 includes the EGR subsystem 41, the sensors 56, 58, 60 may also include one or more chemical (e.g., nitrous oxide) sensors. Comparatively, actuators 62, 64, 66 can include actuators regulating air intake flow (e.g., a throttle valve actuator) and possibly combustive fuel metering within the engine assembly 40. Additionally, when the engine assembly 40 is equipped with the EGR subsystem 41, the actuators 62, 64, 66 may include an exhaust throttle valve actuator for modulating a throttle valve to regulate cooled exhaust gas recirculation to the intake manifold of the engine assembly 40.

An ECU 68 communicates with the integrated electronic devices 56, 58, 60, 62, 64, 66 through the wiring harnesses 24, 26, 28, as further indicated in FIG. 1 by double-headed arrow 70. Similarly, electrical power is provided to the integrated electronic devices 56, 58, 60, 62, 64, 66 from a power supply 72, such as a work vehicle battery, through wiring harnesses 24, 26, 28 and any associated electrical connectors, as indicated by arrow 74. Such a power supply 72 may or may not be routed through the ECU 68 prior to delivery to the wiring harness(es).

The wiring harness(es) may be mounted to different exterior portions of the work vehicle engine assembly 40 (or another work vehicle component in other instances of the work vehicle system) and electrically interconnected in any suitable manner. An example of one manner in which a wiring harness may be mounted to an exterior region or surface of the work vehicle engine assembly 40 is shown in FIG. 2. In the illustrated example, wiring harness 24 is mounted to work vehicle engine assembly 40 utilizing a number of mechanical fasteners 76 that may include clamps, brackets, and similar structures, which are bolted or otherwise fastened to mounting features formed in the outer walls of engine block, the header assembly, or other sections of the work vehicle engine. Often, and as illustrated in FIG. 2, a surface 78 to which the wiring harness 24 is mounted has a non-planar topology characterized by raised protrusions, steps, recesses, or other such 3D topological features. Accordingly, the wiring harness 24 does not have a planar or flat geometry, but is rather imparted with a non-planar 3D shape generally following the outer contour or topology of the non-planar surface 78, a portion of which is illustrated in FIG. 2. Accordingly, the wiring harness 24 may be fabricated to generally follow the non-planar contours of the non-planar mounting surface 78, with the shape of the wiring harness 24 varying among embodiments depending upon the exterior geometry of the work vehicle engine assembly 40 (or other component to which the wiring harnesses are mounted) and the location of the integrated electronic devices within the work vehicle engine assembly 40.

Figure 3:
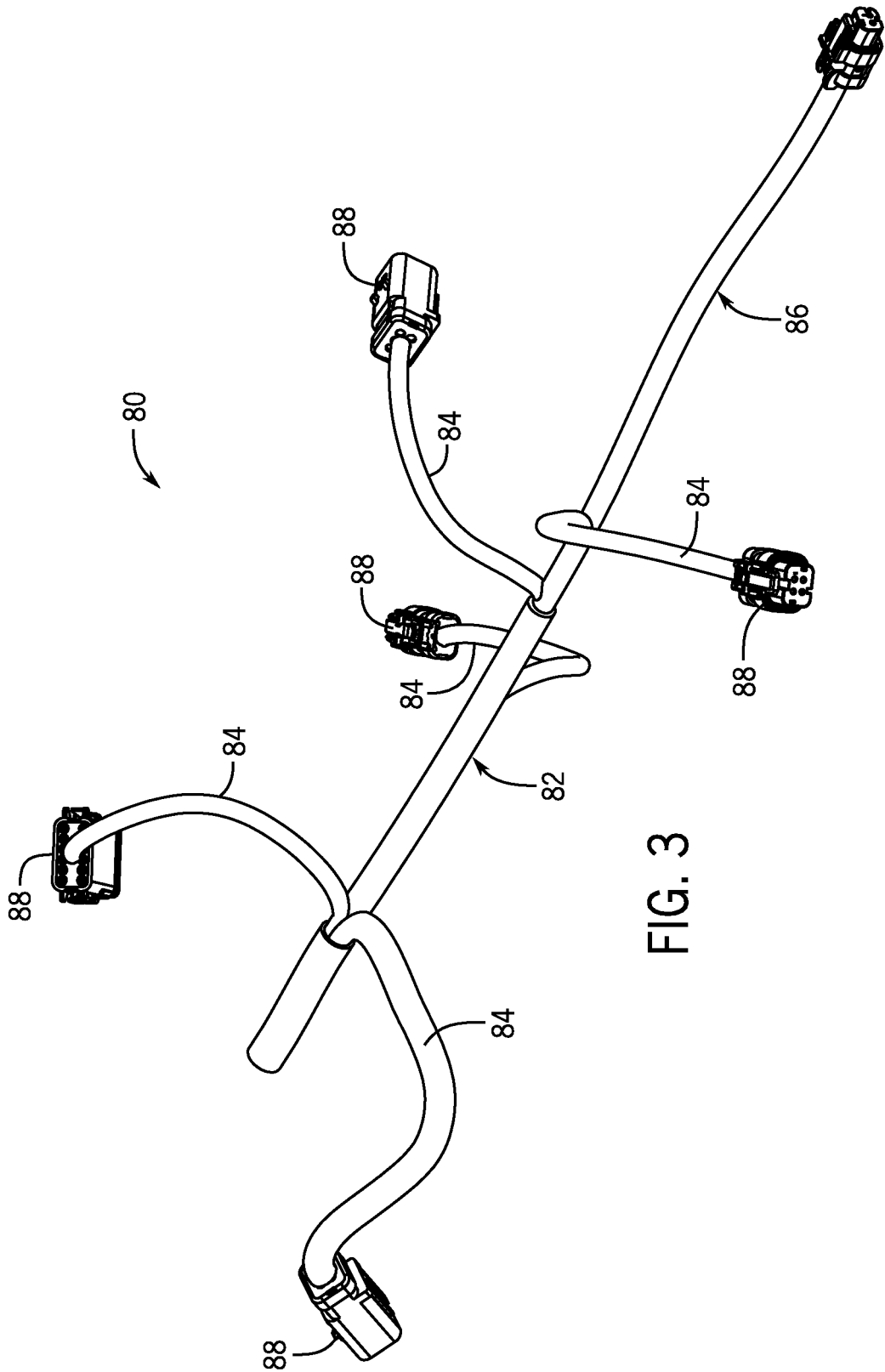
FIG. 3 is a perspective view of a three-dimensional wiring harness that includes a plurality of breakout harness branches extending out from a main harness branch at a plurality of breakout angles in accordance with an example embodiment of the present disclosure.

An example of a three-dimensional (3D) wiring harness 80 that may be mounted to an exterior region of a work vehicle engine assembly 40 is shown in FIG. 3. The wiring harness 80 includes a main harness branch 82 and a plurality of breakout harness branches 84 extending off the main harness branch 82. The main harness branch 82 is comprised of a plurality of wires (not shown) bundled together and wrapped in an outer sheath or binding member 86 (e.g., tape winding). Individual wires branch off the main harness branch 82 at a number of desired locations to form the breakout harness branches 84. Each of the breakout harness branches 84 includes an I/O connector 88 at a distal end thereof that is configured to mate with an associated electrical device (e.g., any of sensors 56, 58, 60, FIG. 1) on the work vehicle engine assembly 40. The mating of the breakout harness branch I/O connector 88 and electrical device may be of a plug-socket type engagement where terminals of the I/O connector 88 are inserted into a socket of the electrical device, in one embodiment.

The location of the breakout harness branches 84 and the angle or orientation at which the breakout harness branches 84 branch off from the main harness branch 82 will vary based on the desired configuration of the wiring harness 80, which may correspond to the arrangement of electrical devices of a work vehicle engine assembly to which the wiring harness 80 is to be connected, in one embodiment. As examples, the breakout harness branches 84 may branch off from the main harness branch 82 at a plurality of breakout angles and, additionally the breakout harness branches 84 may branch off from the main harness branch 82 about a 360° circumferential range of the main harness branch 82 and at oblique-angle orientations that are non-parallel and non-perpendicular to the tool board base 92 (e.g., 30°, 45° and/or 60° angles, for example). The binding member 86 of the wiring harness 80 may be applied to the main harness branch 82 and/or breakout harness branches 84 to hold and retain a shape thereof upon manufacturing of the wiring harness 80. Regarding this shape retention provided by the binding member 86, the binding member 86 may be applied to each/all of the main harness branch 82 and breakout harness branches 84 or, in other implementations, may be applied only to the bent portion(s) of the branches.

As will be explained in greater detail below, the 3D wiring harness 80 may be assembled/manufacturing according to a 3D model that has been generated by a computing device. The 3D model of the wiring harness 80 may be derived from a planned connection of the wiring harness 80 to a plurality of electrical components in the work vehicle, with the 3D model configuring the proposed wiring harness 80 such that the main harness branch 82 and plurality of breakout harness branches 84 are provided to generally correspond to the contours of an exterior region or surface of work vehicle engine assembly 40 and to the layout and positioning of electrical devices in the engine assembly to which the wiring harness 80 is to be connected. Upon generation of the 3D model of the wiring harness 80, the model is provided to a manufacturer—who implements the 3D model in designing a tool board assembly by which the wiring harness 80 may be assembled.

Referring now to FIGS. 4-7, an example of a tool board assembly 90 that may be used to assemble or manufacture a 3D wiring harness 80 is shown. The tool board assembly 90 is constructed and arranged in accordance with a desired routing and configuration of a 3D wiring harness 80 to be assembled. In one embodiment, the configuration of a 3D wiring harness 80 is provided by a 3D wiring harness model that has previously been generated. The tool board assembly 90 is constructed to provide for support of the wiring harness 80 during assembly and enable a desired arrangement and orientation of breakout harness branches 84 off the main harness branch 82, according to the proposed 3D wiring harness 80.

Figure 4:
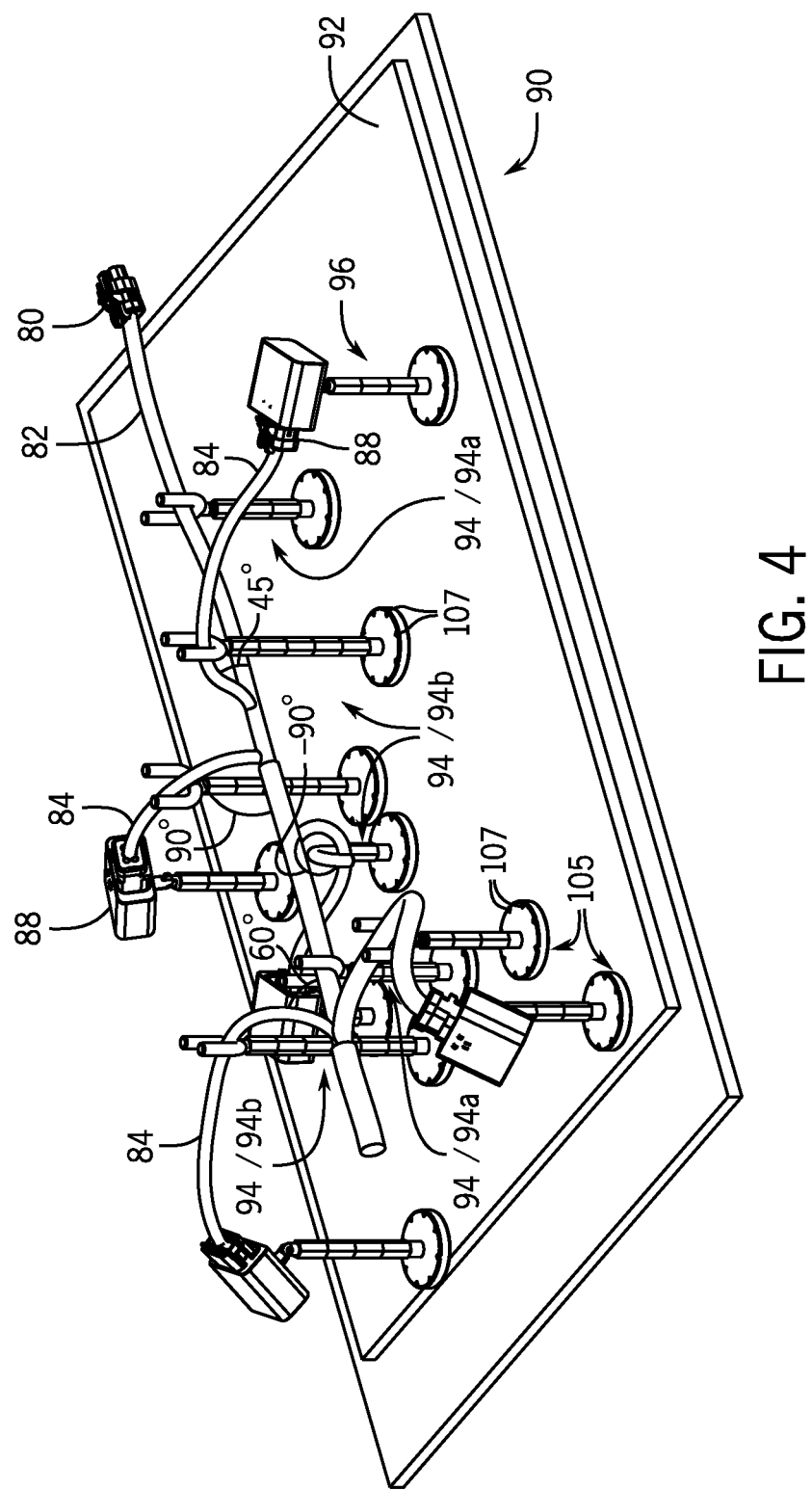
FIG. 4 is a perspective view of a wiring harness provided on a tool board assembly that provides for assembly of the wiring harness according to a provided 3D model of the wiring harness in accordance with an example manufacturing process.
Figure 5:
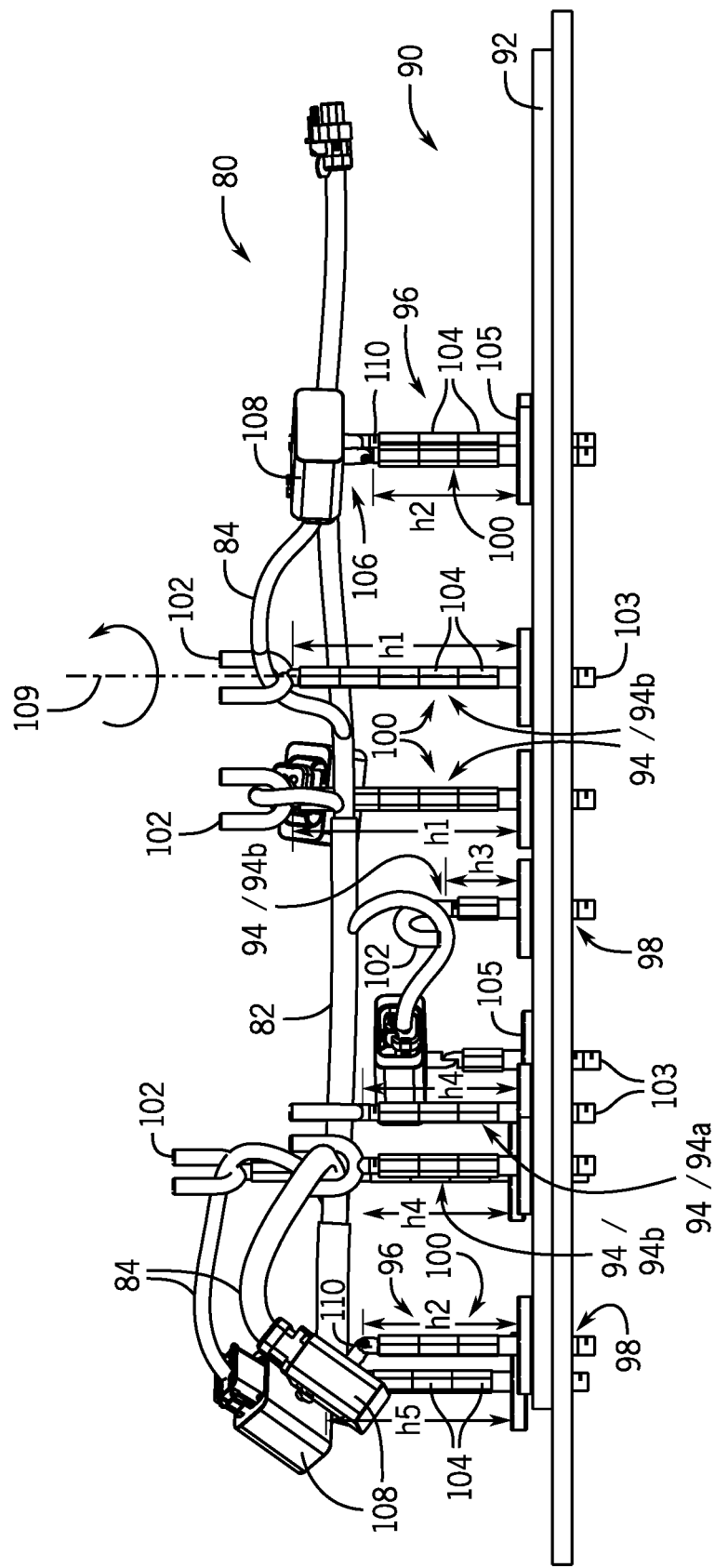
FIG. 5 is a side plan view of the wiring harness and tool board assembly shown in FIG. 4.
Figure 6:
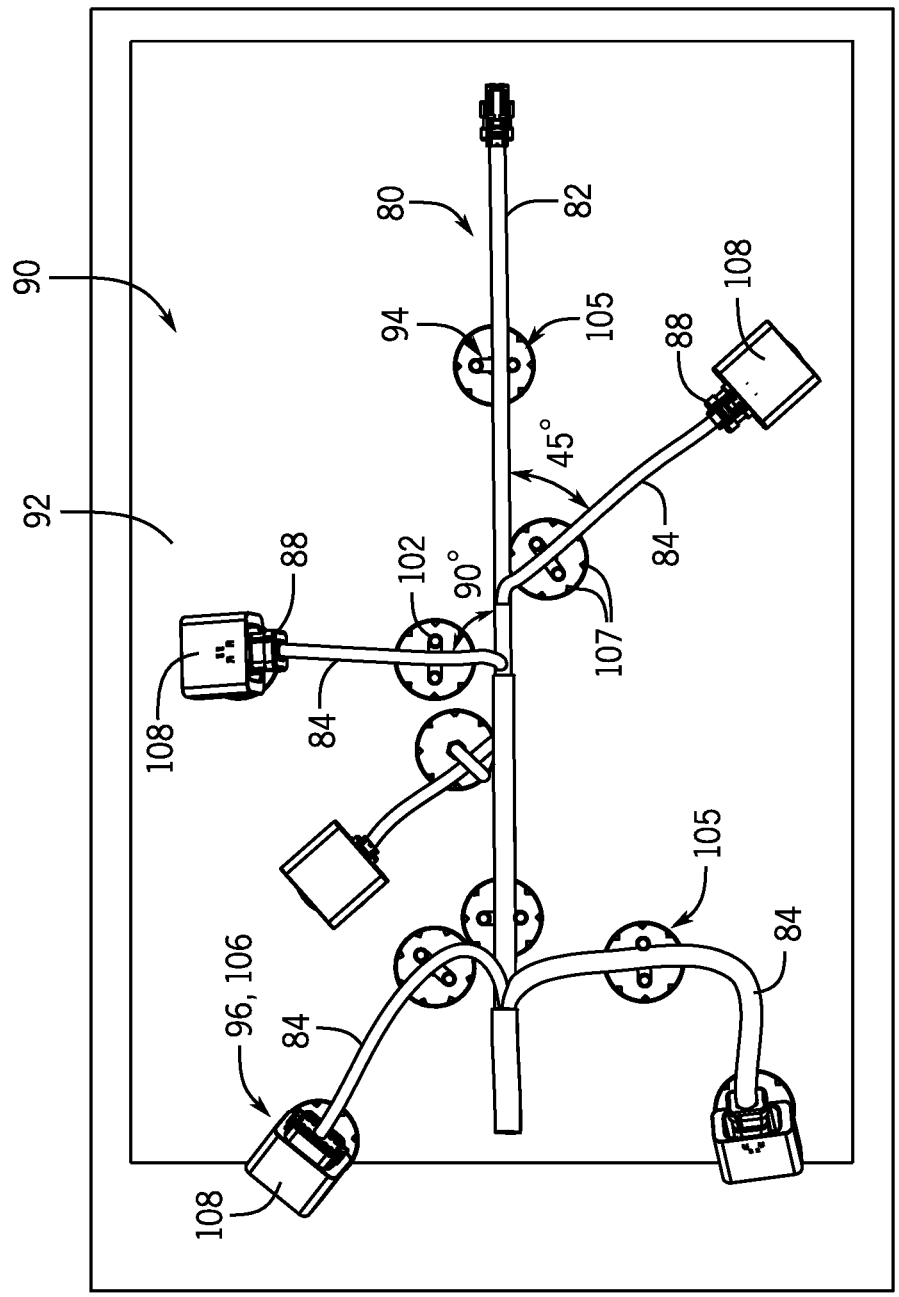
FIG. 6 is a top view of the wiring harness and tool board assembly shown in FIG. 4.
Figures 7A, 7B, 7C:
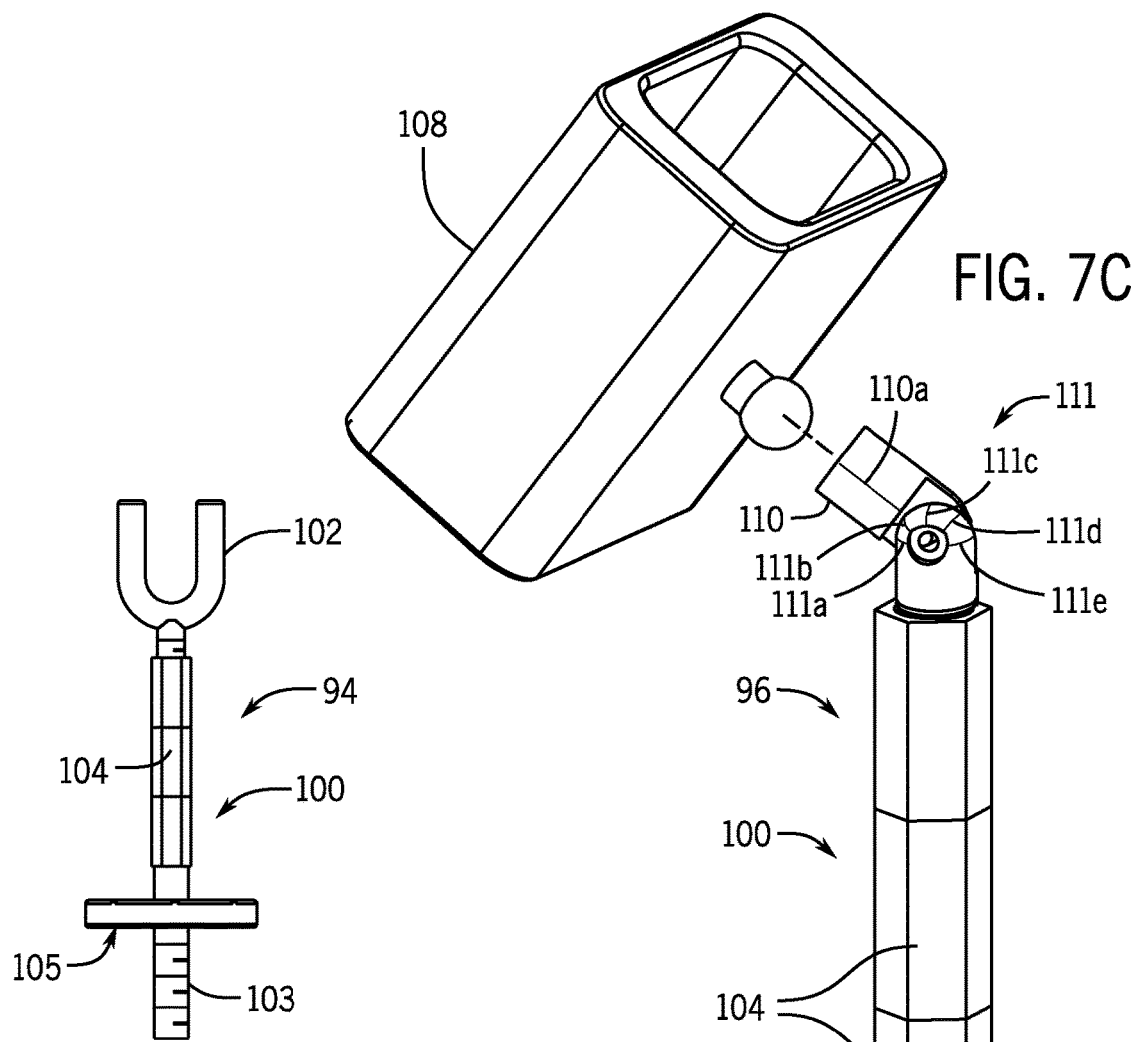
FIG. 7A is a detailed view of a wire/bundle support of the wiring harness and tool board assembly shown in FIG. 4.
FIG. 7B is a detailed view of a shaft section included in the wire/bundle support shown in FIG. 7A.
FIG. 7C is a detailed view of an I/O connector holder of the wiring harness and tool board assembly shown in FIG. 4.

As illustrated in FIGS. 4-6, the tool board assembly 90 includes a tool board base 92 on which a plurality of wire supports 94 and I/O connector holders 96 are arranged. Each of the wire supports 94 and I/O connector holders 96 is arranged at a desired location and according to a desired construction (e.g., height and/or angle) to provide for support of the wiring harness 80 during assembly and to enable a desired arrangement and orientation of breakout harness branches 84 off the main harness branch 82.

The tool board base 92, or "foam board" as sometimes termed, provides a planar base structure to which the wire supports 94 and I/O connector holders 96 may be secured. Mounts or openings 98 may be formed on the tool board base 92 into which the wire supports 94 and I/O connector holders 96 may be mounted.

The wire supports 94 each extend vertically upward from the tool board base 92 and are configured to support the main harness branch 82 and breakout harness branches 84 during assembly thereof. As shown in FIGS. 4-6 and also in FIG. 7A, each wire support 94 includes a base shaft 100 that mounts to the tool board base 92 and a wire holder 102 positioned on top of the base shaft 100. The base shaft 100 is constructed such that a length thereof is adjustable, to thereby provide for positioning of the wire holder 102 at a desired height above the tool board base 92. In one implementation, the base shaft 100 may be formed of a base stud 103 that mates with an opening 98 in the tool board base 92 (e.g., via a threaded engagement) and one or more shaft sections 104—a selective number of which may be stacked together and mated with each other—to selectively increase or decrease the length of the shaft 100. As shown in further detail in FIG. 7B, each shaft section 104 may be of configured to engage with other shaft sections 104, such as via a threaded engagement 104a, and with a bottommost section 104 mating with the base stud 103 via a sliding engagement therewith (i.e., the base stud 103 being slid into the shaft section 104). The number of shaft sections 104 in the base shaft 100 is selected based on a desired height of the wire support 94. As an example, each shaft section may have a length of 20 mm, such that wire supports with a height of 40 mm, 60 mm, or 100 mm, as examples, could easily be constructed by assembling/connecting the appropriate number of shaft sections 104.

In one implementation, one or more of the wire holders 102 may be constructed as a fork portion having a U-shape with an open top, such that wire(s) of the wiring harness 80 may be easily placed onto the wire holder 102. In another implementation, one or more of the wire holders 102 may be constructed as a hooked portion having a J-shape, with wire(s) of the wiring harness 80 being placed within and under the hooked portion of the wire holder 102. A bottom of the wire holder 102 may be configured as a threaded shaft that mates with a topmost shaft section 104 of the base shaft 100, such as by the wire holder being screwed into the shaft section 104 to secure it in place.

In the illustrated embodiment, each wire support 94 further includes a wire support base 105 that is positioned about the base stud 103 and adjacent the tool board base 92. The wire support base 105 is a circular base that includes graduated markings 107 about the circumference thereof, with such markings 107 being at 45° increments, for example. The markings 107 allow for the wire holder 102 to be rotated about an axis 109 aligned with the base shaft 100 to position the forks of the wire holder 102 at a desired position/angle as determined/measured relative to the main harness branch 82. Rotation of the wire holder 102 may be performed by rotating the stack or shaft sections 104 (and the wire holder 102 secured thereto) about the base stud 103, as engagement of the bottommost shaft section 104 with the base stud 103 allows for such rotation. The opening of the U-shaped wire holder 102 may therefore be oriented in a desired direction, and confirmation of a desired orientation may easily be made by aligning the opening of the wire holder 102 with a marking 107 on the wire support base 105, such that a breakout harness branch 84 of the wiring harness 80 may pass through the wire holder 102 at a desired breakout angle off of the main harness branch 82, such as at 30°, 45°, 60°, 90°, etc., as measured within a including the main harness branch 82 and plane parallel to the tool base board 92. It is recognized that the wire supports 94 should be positioned close to the locations where the breakout harness branches 84 branch off the main harness branch 82 to ensure a correct angle and direction for the forks of the wire holders 102 and to thereby provide proper breakout angles/orientations for the breakout harness branches 84.

Similar to the wire supports 94, each of the I/O connector holders 96 extend vertically upward from the tool board base 92. As shown in FIGS. 4-6 and also in FIG. 7C, each I/O connector holder 96 includes a base shaft 100 that mounts to the tool board base 92 and a connector mount 106 positioned on top of the base shaft 100. As described for the wire supports 94, the base shaft 100 of each I/O connector holder 96 is constructed of a base stud 103 that mates with an opening 98 in the tool board base 92 (e.g., via a threaded engagement) and one or more shaft sections 104—a selective number of which may be stacked together and mated with each other (such as via a threaded engagement, see FIG. 7B)—to selectively increase or decrease the length of the shaft 100. Accordingly, a length of the base shaft 100 is adjustable to thereby provide for positioning of the connector mount 106 at a desired height above the tool board base 92.

The connector mount 106 of each I/O connector holder 96 may be provided in the form of an angularly adjustable connection port 108 into which a respective I/O connector 88 at the end of a breakout harness branches 84 may be inserted (e.g., snap fit connection), along with a pivotable connection 110 (pivot point). The angularly adjustable connection port 108 may be secured to the base shaft 100 via the pivotable connection 110, such that the connection port 108 may rotate relative to the base shaft 100 and thereby be angled relative to the tool base plate 92 (i.e., to a plane defined by the tool base plate 92). This rotation of the connection port 108 allows for positioning thereof at a desired angle that matches an angle at which it is desired to provide an I/O connector 88 at the end of a respective breakout harness branch 84. In one embodiment, a bottom of the pivotable connection 110 may be configured as a threaded shaft that mates with a topmost shaft section 104 of the base shaft 100, such as by the pivotable connection 110 being screwed into the shaft section 104 to secure it in place. The pivotable connection 110 may further include thereon graduated marks 110*a*, 111*a*-111*e* that indicate an angle at which the connection port 108 is rotated relative to the base shaft 100 (and relative to tool base plate 92), such as marks for 0°, 45°, 90°, 135°, and 180° angles.

Figure 8:
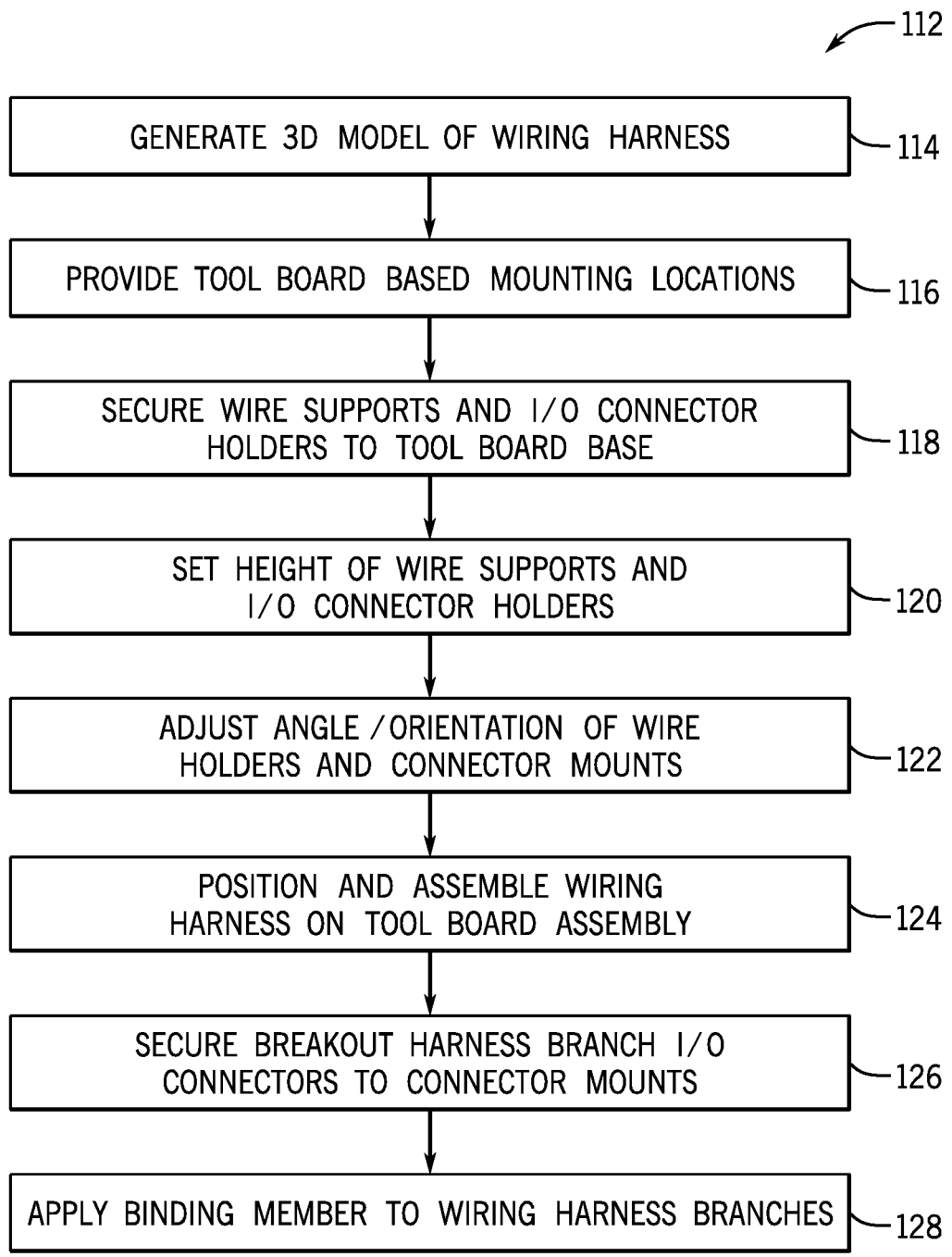
FIG. 8 is a flowchart illustrating a method of manufacturing a 3D wiring harness in accordance with an example embodiment of the present disclosure.

Described now here below is a step-by-step method by which the tool board assembly 90 may be used to manufacture/assemble a 3D wiring harness 80, according to an embodiment of the invention. A flowchart illustrating such a method 112 is provided in FIG. 8, with continued reference also being made to FIGS. 1-7.

Initially, a 3D model of a wiring harness 80 to be manufactured is generated (step 114) according to a planned connection of such a wiring harness 80 to a plurality of electrical components in a work vehicle 20. The 3D model of the wiring harness 80 is specific to an intended implementation of the wiring harness 80, but generally models a construction of a main harness branch 82 having a plurality of breakout harness branches 84 arranged at a plurality of modeled breakout angles and orientations relative to the main harness branch 82. That is, the 3D wiring harness 80 is modeled such that the breakout harness branches 84 may be oriented circumferentially about the main harness branch 82 about a 360° circumferential range of the main harness branch 82 and at oblique-angle orientations that are non-parallel and non-perpendicular to the tool board base 92 (e.g., 30°, 45° and/or 60° angles, for example). Additionally, the breakout harness branches 84 branch out from the main harness branch 82 at different angles that may include 30°, 45°, 60°, and 90° angles, as shown in FIGS. 4 and 5.

Upon generation of the 3D model of the wiring harness 80, the tool board assembly 90 is then constructed (steps 116-128) in accordance with the 3D, with wire supports 94 and I/O connector holders 96 positioned and oriented on the tool board base 92 to enable assembly of the wiring harness 80 according to the 3D model. First, mounting locations are located and provided on the tool board base 92 (step 116) at which wire supports 94 and I/O connector holders 96 will be secured thereto. Upon identification of these mounting locations, wire support 94 and I/O connector holders 96 are secured to the tool board base 92 (step 118). Securing of the wire supports 94 and I/O connector holders 96 to the tool board base 92 may be accomplished via any of a number of suitable fastening devices or means that couple the base shaft 100 thereof to the tool board base 92, including fastening hardware, a quick-connect type engagement, or a twist-lock type engagement, as examples.

Upon securing of the wire supports 94 and I/O connector holders 96 to the tool board base 92, a height of each of the wire supports 94 and I/O connector holders 96 is set via adjustment/construction of the base shaft 100 thereof (step 120). As previously indicated, the base shaft 100 may be constructed of one or more stackable/connectable shaft sections 104—the number of which may be selected to increase or decrease the length of the shaft 100 and provide a wire support 94 of a desired height. Via adjustment of the base shaft 100 of each of the wire supports 94 and I/O connector holders 96, the wire holder 102 and the connector mount 106 of each wire support 94 and I/O connector holder 96 may be set at a desired height above the tool board base 92 for reception of wires and I/O connectors 88 of the wiring harness 80 to be assembled.

In addition to adjusting a length of the base shafts 100 of the wire supports 94 and I/O connector holders 96 to set the wire holders 102 and the connector mounts 106 at a desired height above the tool board base 92, angles and orientations of the wire holders 102 and the connector mounts 106 may also be adjusted (step 122) into a configuration that will provide for assembly of the modeled 3D wiring harness 80. Each wire holder 102 may be rotated about its axis 109 on the base shaft 100 into a position where the opening of the U-shaped wire holder 102 may be oriented to face a desired direction for passing a wiring harness branch 82, 84 therethrough. Each connector mount 106 may be pivoted via a pivotable connection 110 by which it is coupled to the base shaft 100 to angle the connector mount 106 relative to the tool base board 92.

Upon securing the wire supports 94 and I/O connector holders 96 and configuring them to desired heights and angles/orientation, the wiring harness 80 may then be positioned and assembled on the tool board assembly 90 (step 124). Initially, various wires that will form the wiring harness 80 are routed along a path formed by the wire supports 94. Wires that form the main harness branch 82 are routed through the wire holders 102 of main branch wire supports 94a, while wires that form the breakout harness branches 84 are routed through the wire holders 102 of breakout branch wire supports 94b. As can be seen in FIGS. 4 and 5, the heights of various wire supports 94 in the tool board assembly 90 are such that some of the breakout branch wire supports 94b are positioned above a level/height of the main branch wire supports 94a and some of the breakout branch wire supports 94b are positioned below a level/height of the main branch wire supports 94a, with heights h1-h5 provided in FIG. 5 as examples.

The differing heights of the breakout branch wire supports 94b, along with positioning thereof on each of opposing sides of the main branch wire supports 94a and rotating/angling the breakout branch wire supports 94b relative to the main harness branch 82, allows for the breakout harness branches 84 to branch off of the main harness branch 82 at a plurality of circumferential orientations about the main harness branch 82 (at angles relative to the tool base board 92) and at a plurality of angles relative to the main harness branch 82. In one implementation the breakout harness branches 84 are branched off from the main harness branch 82 and routed through the wire holders 102 of the various breakout branch wire supports 94b such that the plurality of breakout harness branches 84 are oriented circumferentially about the main harness branch 82 about a 360° range thereof and at oblique-angle orientations that are non-parallel and non-perpendicular to the tool board base 92 (e.g., 30°, 45° and/or 60° angles, for example), in accordance with the 3D model of the wiring harness 80. Additionally, the breakout harness branches 84 are branched off from the main harness branch 82 and routed through the wire holders 102 of the various breakout branch wire supports 94b such that the plurality of breakout harness branches 84 are angled off from the main harness branch 82 at a plurality of differing angles (within a plane including the main harness branch 82 and parallel to the tool base board 92), such as at angles of 30°, 45° 60°, or 90°, for example.

Upon positioning and routing of wires forming the main harness branch 82 and the breakout harness branches 84 through the various wire supports 94, the I/O connector 88 of each breakout harness branch may subsequently be secured to its respective connector mount 106 with each connector mount 106 at its desired angle (step 126). As previously indicated, the I/O connector 88 of each breakout harness branch 84 may be secured onto the connector mount 106 via any of a number of suitable means, including a snap fit, sliding engagement, or via clamps (not shown) on the connector mount 106, as examples. Securing of each I/O connector 88 to its associated connector mount 106 further helps to maintain the breakout harness branches 84 at desired locations (orientations and angles) on the tool board assembly 90.

Upon positioning of the wiring harness 80 on the tool board assembly 90, via routing of the harness wires though the plurality of wire connectors 94 and securing of the I/O connectors 88 of the harness to the plurality of I/O connector holders 96, the wiring harness 80 may then be finalized by performing further steps that aid in maintaining the desired 3D shape of the wiring harness 80. For retaining the main harness branch 82 and breakout harness branches 84 in their desired shape, a binding member 86 may be applied to the main harness branch 82 and/or breakout harness branches 84 (step 128).

Beneficially, embodiments of the invention thus provide a method of manufacturing a wiring harness in a work vehicle system. The method utilizes a 3D model of the wiring harness that is generated according to a planned connection of the wiring harness to a plurality of electrical components in the work vehicle. The 3D model of the wiring harness includes a plurality of breakout harness branches arranged at a plurality of modeled breakout angles relative to the main harness branch and at oblique-angle orientations that are non-parallel and non-perpendicular to a tool board base. A tool board assembly is then constructed and arranged according to the 3D model, with wire supports and I/O connector holders of the assembly being positioned at a plurality of different heights above the tool board base and at a plurality of different angles and orientations. The wiring harness is then positioned on the tool board assembly, with the main harness branch and the breakout harness branches supported and held by the wire supports and the I/O connector holders to arrange the breakout harness branches at breakout angles and orientations that match the modeled breakout angles and orientations from the 3D model. The wiring harness can therefore be assembled such that the breakout harness branches thereof are oriented circumferentially about the main harness branch about a 360° circumferential range of the main harness branch and such that the breakout harness branches branch out from the main harness branch at oblique-angle orientations that are non-parallel and non-perpendicular to the tool board base, such as at different angles that may include 30°, 45°, and/or 60° angles. The resulting wiring harness may therefore match the 3D model thereof, as compared to prior art wiring harnesses assembled and manufactured off a 2D model that lacked desired breakout harness branch orientations and angles.

ENUMERATED EXAMPLES

The following examples of methods of manufacturing a wiring harness for a work vehicle are further provided and numbered for ease of reference.

1. A method of manufacturing a wiring harness for a work vehicle includes providing a tool board assembly having a tool board base, a plurality of wire supports extending from the tool board base and each having a wire holder on a top end thereof distal from the tool board base, and a plurality of input/output (I/O) connector holders extending from the tool board base and each having an angularly adjustable connector mount on a top end thereof distal from the tool board base. The method also includes providing a wiring harness comprising a main harness branch and a plurality of breakout harness branches extending off the main harness branch, with each breakout harness branch having an I/O connector at an end thereof, and configuring the wiring harness, via arranging thereof on the tool board assembly, to arrange the plurality of breakout harness branches at a plurality of breakout angles relative to the main harness branch and at oblique-angle orientations that are non-parallel and non-perpendicular to the tool board base.

2. The method of example 1, further including generating a three-dimensional (3D) model of the wiring harness according to a planned connection of the wiring harness to a plurality of electrical components in the work vehicle, with the 3D model of the wiring harness having the plurality of breakout harness branches arranged at a plurality of modeled breakout angles relative to the main harness branch to connect with the plurality of electrical components in the work vehicle.

3. The method of example 2, wherein configuring the wiring harness includes configuring the wiring harness to arrange the plurality of breakout harness branches at the plurality of breakout angles to match the plurality of modeled breakout angles.

4. The method of example 2, wherein generating the 3D model of the wiring harness includes modeling the wiring harness to orient the plurality of breakout harness branches circumferentially about the main harness branch about a 360° range of the main harness branch.

5. The method of example 1, wherein providing the tool board assembly includes positioning the wiring harness on the plurality of wire supports and the plurality of I/O connector holders to arrange the plurality of breakout harness branches at the plurality of breakout angles relative to the main harness branch.

6. The method of example 5, wherein configuring the wiring harness includes setting the plurality of wire holders and the angularly adjustable connector mounts at a plurality of different heights above the tool board base, rotating the plurality of wire holders relative to the main harness branch, and setting the angularly adjustable connector mounts of the plurality of I/O connector holders at a plurality of different angles relative to the tool board base.

7. The method of example 6, wherein setting the plurality of wire holders and the angularly adjustable connector mounts at the plurality of different heights comprises, for each respective wire holder and angularly adjustable connector mount, forming a base shaft having a desired height onto which the wire holder or angularly adjustable connector mount may be secured, wherein forming the base shaft includes securing a base stud into an opening in the tool board base and stacking and securing one or more shaft sections onto the base stud, with a selected number of shaft sections being stacked and secured onto the base stud to reach the desired, and wherein the wire holder or angularly adjustable connector mount is secured to a topmost one of the one or more shaft sections.

8. The method of example 7, wherein setting the angularly adjustable connector mounts at the plurality of different angles comprises pivoting each angularly adjustable connector mount to a desired angle via a pivotable connection thereof coupled to a topmost one of the one or more shaft sections.

9. The method of example 7, wherein rotating the plurality of wire holders comprises rotating the base shaft of each of the plurality of wire holders to orient the plurality of wire holders at desired angles relative to the main harness branch.

10. The method of example 9, wherein the base shaft of a respective wire holder is rotated relative to a circular wire support base positioned at a bottom of the base shaft and about the base stud, with an opening defined by the wire holder aligned with one of a plurality of graduated markings included about a circumference of the circular wire support base to enable orientation of the wire holder at a desired angle.

11. The method of example 6, wherein the plurality of different heights comprises heights above a height of the main harness branch and below a height of the main harness branch.

12. The method of example 5, wherein positioning the wiring harness on the plurality of I/O connector holders comprises securing the I/O connector at the end of each of the plurality of breakout harness branches to a respective angularly adjustable connector mount.

13. The method of example 1, wherein the oblique-angle orientations that are non-parallel and non-perpendicular to the tool board base comprise two or more of 30°, 45° or 60° angles.

14. A method of manufacturing a wiring harness for a work vehicle using a tool board assembly is provided, the tool board assembly including a tool board base, a plurality of wire supports extending from the tool board base and each having a wire holder on a top end thereof distal from the tool board base, and a plurality of input/output (I/O) connector holders extending from the tool board base and each having an angularly adjustable connector mount on a top end thereof distal from the tool board base. The method includes positioning a main harness branch of the wiring harness on a portion of the plurality of wire supports, routing a plurality of breakout harness branches off from the main harness branch and through another portion of the plurality of wire supports, and coupling an I/O connector at an end of each of the plurality of breakout harness branches to a respective I/O connector holder of the plurality of I/O connector holders. In routing the plurality of breakout harness branches through the another portion of the plurality of wire supports and in coupling the I/O connectors to the plurality of I/O connector holders, the plurality of breakout harness are routed through wire holders at a plurality of heights relative to the tool board base and at a plurality of angles relative to the main harness branch, and the I/O connectors are coupled to angularly adjustable connector mounts at a plurality of heights relative to the tool board base and at a plurality of angles relative to the tool board base, such that the plurality of breakout harness branches are held at a plurality of breakout angles relative to the main harness branch and at oblique-angle orientations that are non-parallel and non-perpendicular to the tool board base.

15. The method of example 14, including generating a three-dimensional (3D) model of the wiring harness according to a planned connection of the wiring harness to a plurality of electrical components in the work vehicle, the 3D model of the wiring harness having the plurality of breakout harness branches arranged at a plurality of modeled breakout angles relative to the main harness branch and at oblique-angle orientations that are non-parallel and non-perpendicular to the tool board base, and wherein the wire holders and the angularly adjustable connector mounts are positioned to arrange the plurality of breakout harness branches at the plurality of breakout angles and orientations that match the plurality of modeled breakout angles and orientations from the 3D model.

CONCLUSION

There has been provided a method of manufacturing a wiring harness for a work vehicle system. The method utilizes a 3D model of the wiring harness that is generated according to a planned connection of the wiring harness to a plurality of electrical components in the work vehicle. The 3D model of the wiring harness includes a plurality of breakout harness branches arranged at a plurality of modeled breakout angles relative to the main harness branch and at oblique-angle orientations that are non-parallel and non-perpendicular to a tool board base. A tool board assembly is then constructed and arranged according to the 3D model, with wire supports and I/O connector holders of the assembly being positioned at a plurality of different heights above the tool board base and at a plurality of different angles and orientations. The wiring harness is then positioned on the tool board assembly, with the main harness branch and the breakout harness branches supported and held by the wire supports and the I/O connector holders to arrange the breakout harness branches at breakout angles and orientations that match the modeled breakout angles and orientations from the 3D model. The wiring harness can therefore be assembled such that the breakout harness branches thereof are oriented circumferentially about the main harness branch about a 360° circumferential range of the main harness branch and such that the breakout harness branches branch out from the main harness branch at oblique-angle orientations that are non-parallel and non-perpendicular to the tool board base.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of manufacturing a wiring harness for a work vehicle, the method comprising:
    providing a tool board assembly comprising:
        a tool board base;
        a plurality of wire supports extending from the tool board base and each having a wire holder on a top end thereof distal from the tool board base; and
        a plurality of input/output (I/O) connector holders extending from the tool board base and each having an angularly adjustable connector mount on a top end thereof distal from the tool board base;
    providing a wiring harness comprising a main harness branch and a plurality of breakout harness branches extending off the main harness branch, with each breakout harness branch having an I/O connector at an end thereof;
    configuring the wiring harness, via arranging thereof on the tool board assembly, to arrange the plurality of breakout harness branches at a plurality of breakout angles relative to the main harness branch and at oblique-angle orientations that are non-parallel and non-perpendicular to the tool board base; and
    generating a three-dimensional (3D) model of the wiring harness according to a planned connection of the wiring harness to a plurality of electrical components in the work vehicle, with the 3D model of the wiring harness having the plurality of breakout harness branches arranged at a plurality of modeled breakout angles relative to the main harness branch to connect with the plurality of electrical components in the work vehicle.

2. The method of claim 1, wherein configuring the wiring harness comprises configuring the wiring harness to arrange the plurality of breakout harness branches at the plurality of breakout angles to match the plurality of modeled breakout angles.

3. The method of claim 1, wherein generating the 3D model of the wiring harness comprises modeling the wiring harness to orient the plurality of breakout harness branches circumferentially about the main harness branch about a 360° range of the main harness branch.

4. The method of claim 1, wherein configuring the wiring harness comprises positioning the wiring harness on the plurality of wire supports and the plurality of I/O connector holders to arrange the plurality of breakout harness branches at the plurality of breakout angles relative to the main harness branch.

5. The method of claim 4, wherein providing the tool board assembly comprises:
    setting the plurality of wire holders and the angularly adjustable connector mounts at a plurality of different heights above the tool board base;
    rotating the plurality of wire holders relative to the main harness branch; and
    setting the angularly adjustable connector mounts of the plurality of I/O connector holders at a plurality of different angles relative to the tool board base.

6. The method of claim 5, wherein setting the plurality of wire holders and the angularly adjustable connector mounts at the plurality of different heights comprises, for each respective wire holder and angularly adjustable connector mount, forming a base shaft having a desired height onto which the wire holder or angularly adjustable connector mount may be secured, wherein forming the base shaft comprises:
    securing a base stud into an opening in the tool board base; and
    stacking and securing one or more shaft sections onto the base stud, with a selected number of shaft sections being stacked and secured onto the base stud to reach the desired height;
    wherein the wire holder or angularly adjustable connector mount is secured to a topmost one of the one or more shaft sections.

7. The method of claim 6, wherein setting the angularly adjustable connector mounts at the plurality of different angles comprises pivoting each angularly adjustable connector mount to a desired angle via a pivotable connection thereof coupled to a topmost one of the one or more shaft sections.

8. The method of claim 4, wherein positioning the wiring harness on the plurality of I/O connector holders comprises securing the I/O connector at the end of each of the plurality of breakout harness branches to a respective angularly adjustable connector mount.

9. The method of claim 5, wherein the plurality of different heights comprises heights above a height of the main harness branch and below a height of the main harness branch.

10. The method of claim 6, wherein rotating the plurality of wire holders comprises rotating the base shaft of each of the plurality of wire holders to orient the plurality of wire holders at desired angles relative to the main harness branch.

11. The method of claim 10, wherein the base shaft of a respective wire holder is rotated relative to a circular wire support base positioned at a bottom of the base shaft and about the base stud, with an opening defined by the wire holder aligned with one of a plurality of graduated markings included about a circumference of the circular wire support base to enable orientation of the wire holder at a desired angle.

12. The method of claim 1, wherein the oblique-angle orientations that are non-parallel and non-perpendicular to the tool board base comprise two or more of 30°, 45° or 60° angles.

13. A method of manufacturing a wiring harness for a work vehicle using a tool board assembly, the tool board assembly including a tool board base, a plurality of wire supports extending from the tool board base and each having a wire holder on a top end thereof distal from the tool board base, and a plurality of input/output (I/O) connector holders extending from the tool board base and each having an angularly adjustable connector mount on a top end thereof distal from the tool board base, wherein the method comprises:
  positioning a main harness branch of the wiring harness on a portion of the plurality of wire supports;
  routing a plurality of breakout harness branches off from the main harness branch and through another portion of the plurality of wire supports; and
  coupling an I/O connector at an end of each of the plurality of breakout harness branches to a respective I/O connector holder of the plurality of I/O connector holders;
  wherein, in routing the plurality of breakout harness branches through the another portion of the plurality of wire supports and in coupling the I/O connectors to the plurality of I/O connector holders, the plurality of breakout harness branches are routed through wire holders at a plurality of different heights relative to the tool board base and at a plurality of different angles relative to the main harness branch, and the I/O connectors are coupled to angularly adjustable connector mounts at a plurality of different heights relative to the tool board base and at a plurality of different angles relative to the tool board base, such that the plurality of breakout harness branches are held at a plurality of breakout angles relative to the main harness branch and at oblique-angle orientations that are non-parallel and non-perpendicular to the tool board base.

14. The method of claim 13, further comprising generating a three-dimensional (3D) model of the wiring harness according to a planned connection of the wiring harness to a plurality of electrical components in the work vehicle, the 3D model of the wiring harness having the plurality of breakout harness branches arranged at a plurality of modeled breakout angles relative to the main harness branch and at oblique-angle orientations that are non-parallel and non-perpendicular to the tool board base;
  wherein the wire holders and the angularly adjustable connector mounts are positioned to arrange the plurality of breakout harness branches at the plurality of breakout angles and orientations that match the plurality of modeled breakout angles and orientations from the 3D model.

15. The method of claim 14, wherein generating the 3D model of the wiring harness comprises modeling the wiring harness to orient the plurality of breakout harness branches circumferentially about the main harness branch about a 360° range of the main harness branch.

16. The method of claim 15, comprising:
  setting the plurality of wire holders and the angularly adjustable connector mounts at the plurality of different heights relative to the tool board base;
  rotating the plurality of wire supports relative to the main harness branch; and
  setting the angularly adjustable connector mounts at the plurality of different angles relative to the tool board base.

17. The method of claim 16, wherein setting the plurality of wire holders and the angularly adjustable connector mounts at the plurality of different heights comprises, for each respective wire holder and angularly adjustable connector mount, forming a base shaft having a desired height onto which the wire holder or angularly adjustable connector mount may be secured, wherein forming the base shaft comprises:
  securing a base stud into an opening in the tool board base; and
  stacking and securing one or more shaft sections onto the base stud, with a selected number of shaft sections being stacked and secured onto the base stud to reach the desired height;
  wherein the wire holders or angularly adjustable connector mount is secured to a topmost one of the one or more shaft sections.

18. The method of claim 17, wherein setting the angularly adjustable connector mounts at the plurality of different angles comprises pivoting each angularly adjustable connector mount to a desired angle via a pivotable connection thereof coupled to a topmost one of the one or more shaft sections.

19. The method of claim 17, wherein rotating the plurality of wire holders comprises rotating the base shaft of each of the plurality of wire holders to orient the plurality of wire holders at desired angles relative to the main harness branch, with the base shaft being rotated relative to a circular wire support base positioned at a bottom of the base shaft and about the base stud to align an opening defined by the wire holder with one of a plurality of graduated markings included about a circumference of the circular wire support base, to enable orientation of the wire holder at a desired angle.

* * * * *